United States Patent [19]

Hauschild et al.

[11] 4,361,037
[45] Nov. 30, 1982

[54] DEVICE FOR ELECTRIC MONITORING OF THE LEVEL OF A LIQUID IN A CONTAINER

[75] Inventors: Wolfgang Hauschild, Bad Soden; Hans J. Baumgart, Schwalbach, both of Fed. Rep. of Germany

[73] Assignee: VDO Adolf Schindling AG, Frankfurt am Main, Fed. Rep. of Germany

[21] Appl. No.: 204,143

[22] Filed: Nov. 5, 1980

[30] Foreign Application Priority Data

Nov. 19, 1979 [DE] Fed. Rep. of Germany ....... 2946585

[51] Int. Cl.³ .............................................. G01F 23/10
[52] U.S. Cl. ....................... 73/295; 73/292; 374/110
[58] Field of Search .............. 73/295, 362 AR, 304 R, 73/292, 342

[56] References Cited

U.S. PATENT DOCUMENTS 2,753,713 7/1956 Mabey .................................. 73/295
4,163,391 8/1979 Bezard .................................. 73/295
4,299,126 11/1981 Heuwieser ........................... 73/295

FOREIGN PATENT DOCUMENTS 2740289 4/1978 Fed. Rep. of Germany .
2841889 3/1980 Fed. Rep. of Germany ........ 73/295

Primary Examiner—E. R. Kazenske
Assistant Examiner—Denis E. Corr
Attorney, Agent, or Firm—Martin A. Farber

[57] ABSTRACT

A device for electric monitoring of the level of a liquid present in a container, with a temperature-dependent resistance probe which is immersed in the liquid the level of which is to be monitored, a source of constant current connectable, controlled by a timer, to the resistance probe, a circuit, controlled by the timer, for detecting and storing an initial voltage drop on the resistance probe at an initial time and a measurement voltage at a defined time after the connection of the source of constant current, and a circuit for evaluating these voltages by subtraction of the measurement voltage from the initial voltage and if necessary under circumstances inversion of the difference in order to form a display voltage which corresponds to the level. There are provided a resistance probe structure for compensating for the influence of the change in level of the liquid on the display voltage due to thermal expansion as a function of its initial temperature and a computation circuit for compensating for different heat transfers from the resistance probe to the liquid as a function of the initial temperature.

8 Claims, 6 Drawing Figures

DEVICE FOR ELECTRIC MONITORING OF THE LEVEL OF A LIQUID IN A CONTAINER

The present invention relates to a device for the electric monitoring of the level of a liquid present in a container, having a temperature-dependent resistance probe which is immersed in the liquid whose level is to be monitored, and having a source of constant current connectable to the resistance probe, which source is controlled by a timer. The invention further includes means controlled by the timer for detecting and storing the initial voltage drop on the resistance probe at an initial time and the measurement voltage at a defined time after the connecting of the source of constant current. The invention also comprises means for evaluating said voltages by subtraction of the measurement voltage from the initial voltage and possibly inversion of the difference in order to form a displayed voltage which corresponds to the level.

One such known device (West German Offenlegungschrift No. OS 27 40 289) proceeds from the basis that the level of the liquid present in a container can be measured by measuring the change in the resistance of a metallic resistance element as a function of the temperature which it assumes upon the flow of a defined current. The average temperature of the resistance probe depends on what portion of its total length dips into the liquid since the section which dips therein is more strongly cooled than the section which is in the air. The total resistance of the resistance probe accordingly depends on the level of the liquid. Since it has already been established that this principle of measurement is very sensitive to variations in the surrounding temperature, the device of the prior art was already developed in such a manner that the result of the measurement is less dependent on variations in the surrounding temperature. For this purpose, the average resistance which the resistance probe assumes after the flow of current was referred to an average resistance at an initial time at which the resistance probe is still not heated by the current. In this way it was attempted to exclude the influence of the surrounding temperature, inasmuch as the initial voltage drops over the resistance probe at the initial time is dependent on influence by the surrounding temperature in the same way as the measurement temperature which the resistance probe assumes at a subsequent defined time after the connection of the source of constant current. Specifically, one known embodiment operating on this comparison measurement principle is directed at making it possible to determine a plurality of different liquid levels with one indicating member. For this purpose, the device comprises a source of constant current for the resistance probe from the terminals of which probe the initial voltage is taken at an initial time and the measurement voltage at a defined later time. The initial voltage is stored in a memory. If the measurement voltage is present at the defined later time the difference between the measurement voltage and the initial voltage is determined in a subtraction circuit. The difference can then be compared with given predetermined voltages which correspond to different levels of immersion of the resistance probe in order to provide a display or give off an alarm depending on the result of a comparison.

However, it has been found that incorrect liquid levels have been measured with these known devices despite the comparison principle pursuant to which the measurement voltage is compared with an initial voltage.

The object of the present invention is therefore further to develop a device of the aforementioned type for the electric monitoring of the level of a liquid present in a container in such a manner that the accuracy of the measurement is further increased.

The solution of this problem in accordance with the invention by a further development of the device having the features that means (probe 3 in accordance with FIG. 3) are provided to compensate for the influence of the change in level of the liquid due to thermal expansion as a function of its initial temperature on the displayed voltage as well as means (14–18 in FIG. 4) for compensating for different heat transfers from the resistance probe to the liquid as a function of the initial temperature. The foregoing compensation is based on the discovery that despite the comparison measurement principle, changes in the surrounding temperature produce erroneous measurements of the level since higher temperatures cause a higher level of filling due to expansion of the liquid even though the filling quantity is constant and because, as a function of the temperature of the liquid, the heat transfer between the resistance probe and the liquid changes. The first source of error is noticeable in particular in automatic transmissions of automotive vehicles since the transmissions warm up considerably in operation. The increase in level by the expansion of the transmission liquid is not only dependent on temperature and amount of filling but, under certain circumstances, also on the construction of the transmission. The different heat transfers between the resistance probe and liquid as a function of the temperature of the liquid cause different rates of increase of the average temperature or average resistance of the resistance probe as a function of the time, which also leads to a falsification of the result of the measurement since the resistance probe is fed with constant-current pulses.

By the means provided in accordance with the basic discovery of the invention for compensating for the influence of the change of level of the liquid due to thermal expansion as a function of its initial temperature on the displayed voltage and means for compensating for different heat transfers from the resistance probe to the liquid as a function of the initial temperature, there can be obtained a substantially precise measurement of level while retaining the inexpensive measurement principle employing the resistance probe. The additional correction means for counteracting the influence of the change in level and of the difference in heat transfer, if they are suitably selected, also do not lead to too high an expenditure in order to make it possible to employ this device for many applications, for instance for measuring the level of the liquid in the automatic transmission of an automotive vehicle.

Within a first special embodiment of the device of the invention, as means for compensating for the change in level of the liquid due to thermal expansion, the measurement probe (3) comprises a resistance wire having an upper vertical section (3a) in which the resistance length (4a) is small as compared with the length of the section, and a lower vertical section (3b) in which the resistance wire length (4b) is large as compared with the length of the section (FIG. 3).

This measurement probe is intended for use in a container in the manner that the upper section of the resistance probe (3a) is arranged in the region of the container between the maximum and minimum levels at maximum temperature and the lower section (3b) is arranged in the region of the container below the minimum level at maximum temperature (FIG. 3).

In this way the result is obtained that with the maximum surrounding temperature when the difference between the measurement voltage and the initial voltage is too large this difference is evaluated smaller.

For the development and arrangement of the resistance probe there is employed as means for compensating for differences in heat transfer from the resistance probe (3) to the liquid, within the first special solution, an analog computer circuit arrangement having a first subtraction device (14) in which the difference, multiplied with a factor, between the initial voltage and a fixed reference voltage is formed as correction voltage, and that an output (17) of the first subtraction device is connected with an input of a second subtraction device (18) to form the difference between the original display voltage and the correction voltage as corrected display voltage.

With this analog computer circuit, a linearization of the display voltage of the level as a function of the surrounding temperature is obtained in inexpensive fashion in the manner that the corrected display voltage remains constant over the entire range of surrounding temperatures which occur in practice. This linearization is obtained for any desired levels since, due to aboveindicated construction of the resistance probe, the variation of the original display voltage as a function of the surrounding temperature takes place with the same slope and curvature. In other words, all characteristic curves of the original display voltage as a function of the surrounding temperature extend parallel to each other, with the actual lever as parameter. This device is therefore relatively inexpensive since in order to correct the original display voltage only the constant reference voltage and the initial voltage at the resistance probe need be provided, in which connection the initial voltage must in any event be formed in accordance with the principle of measurement used here.

The control of the means for compensating for different heat transfers from the resistance probe to the liquid is advisedly effected in the manner that in order to store the initial voltage from which the correction voltage is formed there is provided a sensing and storage circuit (9a) which is controlled by a monostable flip-flop stage (21) and in which circuit the initial voltage over the resistance probe (3) can be stored before the switching-in of the resistance probe. In this way assurance is had, in uncomplicated manner, that the initial voltage is determined for the correction of the measurement value measured subsequently and is retained.

As part of another solution of the generic device of the invention, the means including a microprocessor prepared in a given manner are provided in that as means for compensating for the influence of the change in level of the liquid due to thermal expansion and as means for compensating for different heat transfers from the resistance probe to the liquid as a function of the initial temperature, there is provided a microprocessor (28) which is connected with the measurement probe via an analog/digital converter (27) and in which at least the characteristic curves of the dependence of the uncorrected display voltage on the initial temperature for maximum and minimal filling quantities (1, 2 in FIG. 1) are stored and which is adapted to calculate the corrected display voltage from the initial temperature and the original display voltage.

The advantage of this second solution is that it does not require any predetermined course of the uncorrected display voltage as a function of the surrounding temperature for different filling quantities as a parameter and thus special embodiments of the resistance probe can be dispensed with. Rather, the microprocessor in the development indicated is able, on basis of the measured uncorrected display voltage and the measured temperature, to calculate the corrected display voltage for all possible filling quantities.

With the above and other objects and advantages in view, the present invention will become more clearly understood in connection with the detailed description of preferred embodiments, when considered with the accompanying drawings, in which.

Figure 1:
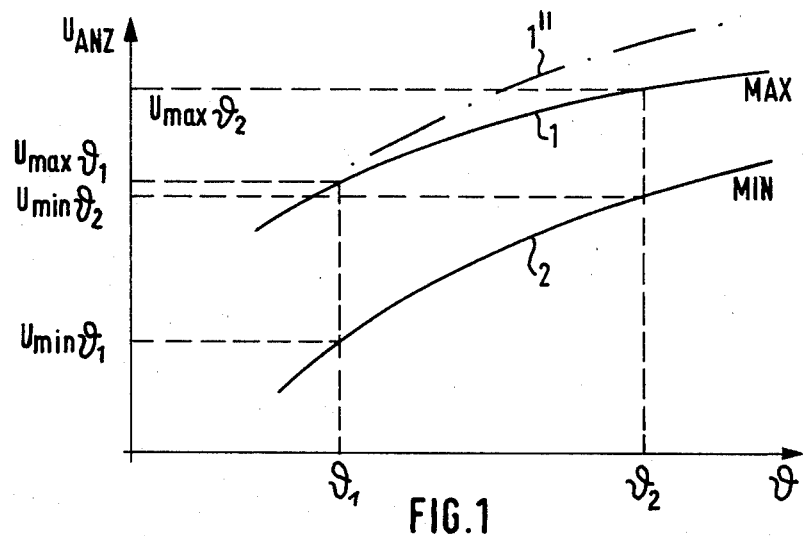
FIG. 1 is a graph showing the curves of the uncorrected display voltage as a function of the temperature of the liquid for maximum and minimum levels of the liquid (curve parameters)

FIG. 1 shows the dependence of a display voltage $U_{ANZ}$ as a function of the liquid temperature $\theta$ whose level is to be measured for a curve of the maximum filling level 1 and a curve of the minimum filling level 2. The display voltage $U_{ANZ}$ is formed here in the manner that the difference voltage between the initial voltage at the resistance probe and the measurement voltage is produced at a given subsequent time after a flow of current through the resistance probe and that this difference voltage is reversed.

From FIG. 1 it can be seen that the uncorrected display voltage for the minimum level of filling corresponding to curve 2 is at all times below the course of the uncorrected display voltage for the maximum level of filling corresponding to curve 1, but that the slope of curve 1 for the maximum level of filling is less, particularly in the region of relatively high temperatures, than that of the curve 2 for minimum level of filling.

Figure 2:
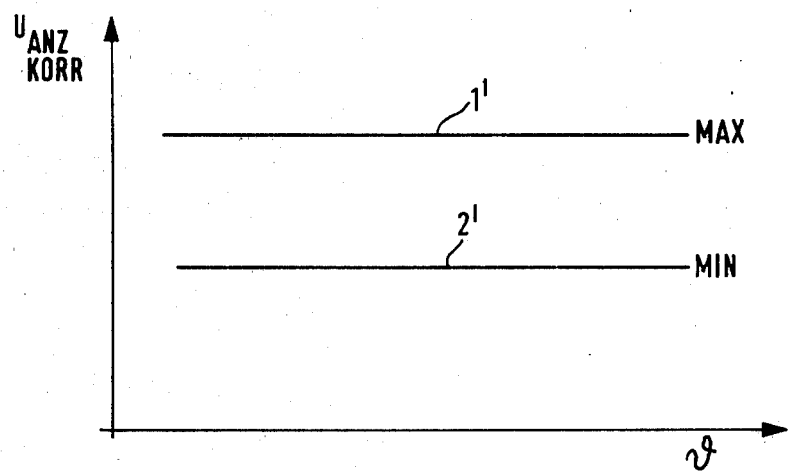
FIG. 2 shows the course of the corrected display voltage as a function of the temperature for the curves in accordance with one embodiment.

There is desired a course of the curve such as shown in FIG. 2 in which the curve for the corrected display voltage $U_{ANZ}$ as a function of the temperature $\theta$ for maximum quantity of filling corresponding to the line 1' and for the minimum quantity of filling corresponding to the straight line 2' is independent of the temperature.

With the course of the curves shown in FIG. 2, the disturbing phenomenon of a curve having a course of FIG. 1 that the difference between the uncorrected display voltage for minimum and maximum levels is greater at low temperature $\theta_1$ than at high temperature $\theta_2$ no longer is present.

Figure 3:
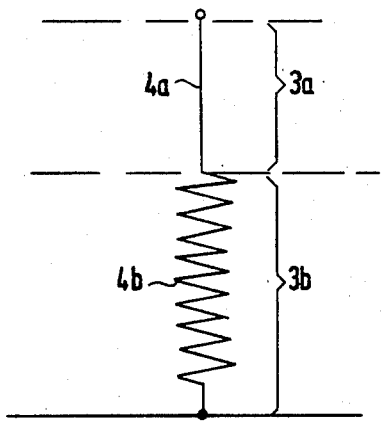
FIG. 3 is a diagrammatic showing of the resistance probe used for the correction in accordance with the first method.

For the development of the resistance probe shown in FIG. 3, the course of curve 1 is first of all adapted to that of curve 2 in order to produce the corrected display voltage shown in FIG. 2. This curve 1 which has been modified to this extent is called 1″. The resistance probe of FIG. 3 comprises an upper section 3a with a relatively short length of the resistance wire 4a and a lower section with a relatively large length of the resistance wire 4b. The section 3a is so dimensioned that it lies in the region between the minimum and maximum filling levels when at the maximum temperature of the liquid. The lower section 3b connects the bottom of the section 3a and thus at maximum temperature is always within the liquid. In this way the result is obtained that the temperature of the upper section 3a is included with relatively little weight in the average resistance of the resistance probe while the temperature of the lower section 3b is included therein with relatively large weight. In this way the difference voltage between the measurement voltage and the initial voltage at maximum temperature is reduced and the curve 1″ is obtained.

Figure 4:
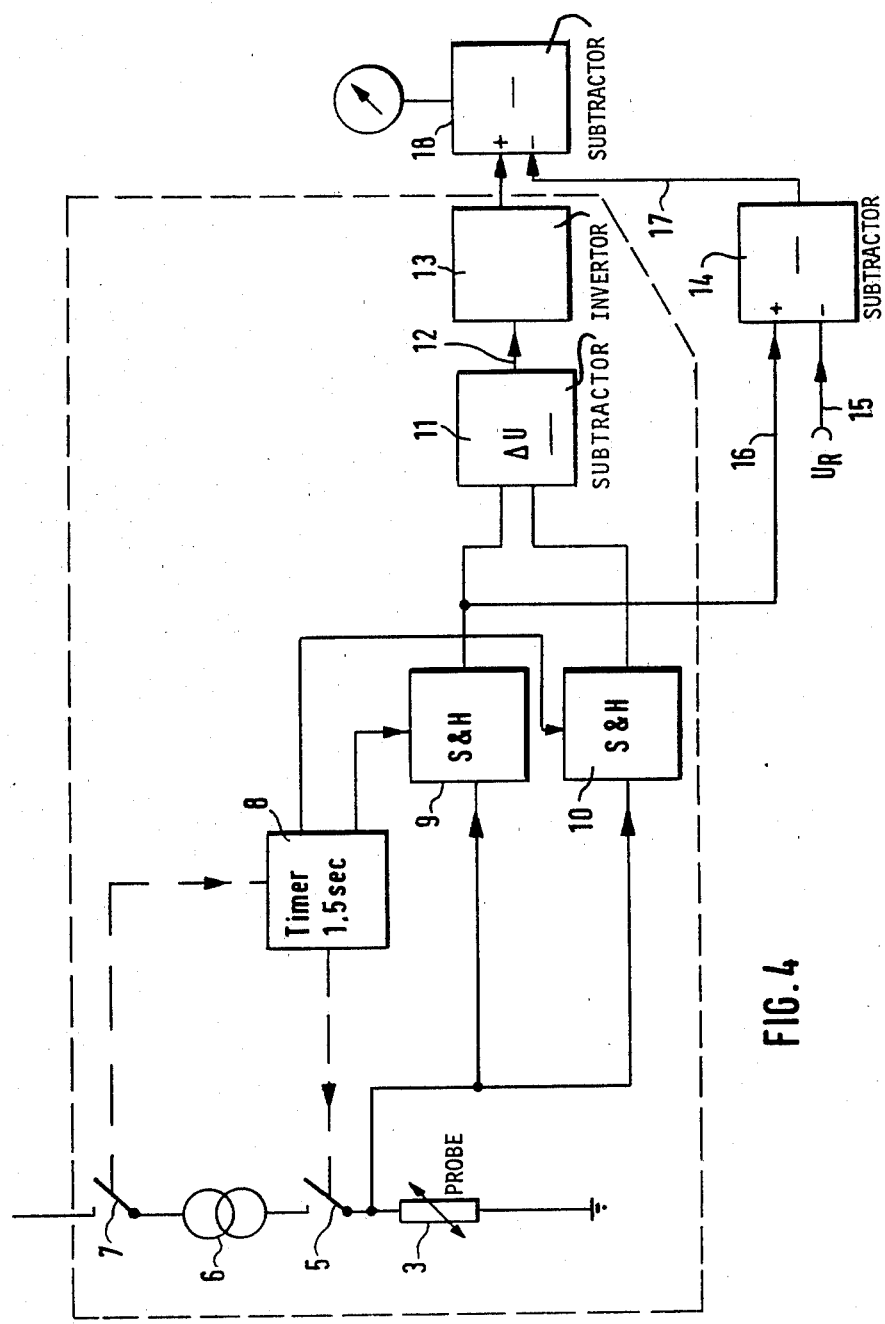
FIG. 4 is a block diagram of the circuit provided for the correction in accordance with the first method for compensating for different heat transfers from the resistance probe in accordance with FIG. 3.
Figure 5:
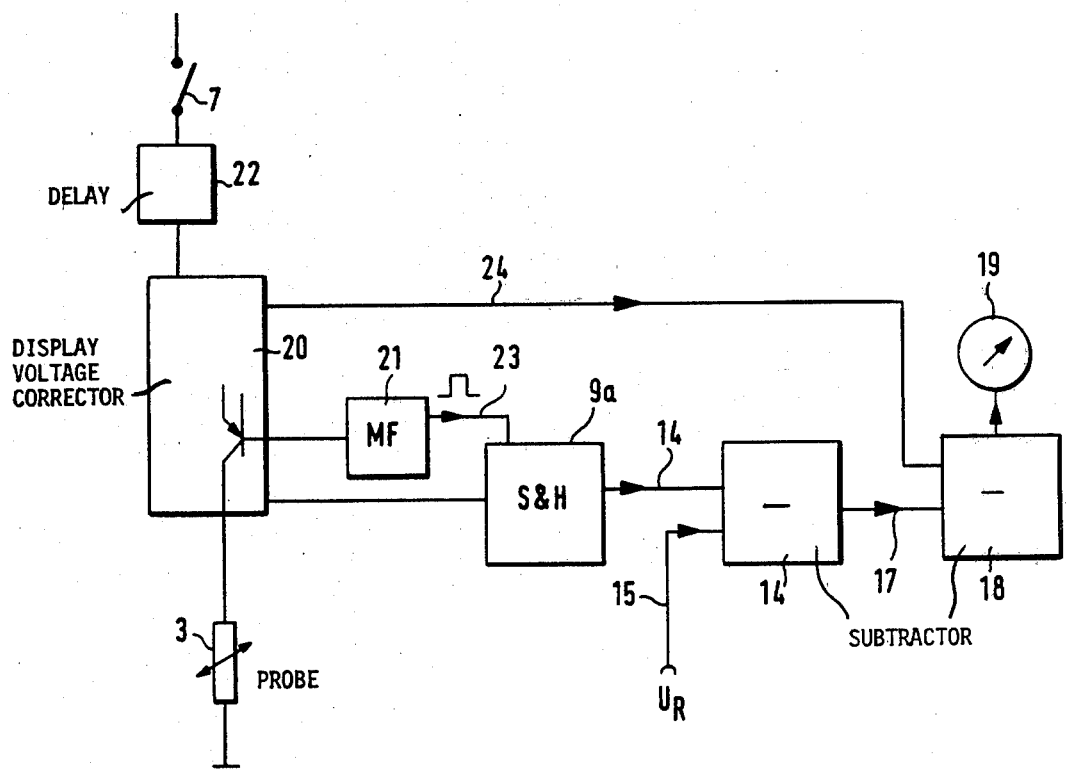
FIG. 5 is a variant of the circuit of FIG. 4 in which, in particular, the control means in the block diagram are shown.

In order to form the constant corrected display voltage in accordance with the straight lines 1′ and 2′ in FIG. 2 from the curves 1″ and 2, the circuits of FIG. 4 or FIG. 5 are provided.

FIG. 4 has a probe 3 in accordance with FIG. 3 which can be fed from a source of constant current 6 via a switch 5. An ignition switch 7 lies in series with the source of constant voltage. A timer 8 serves for switching-on the switch 5, the control input of said timer being connected with the ignition switch 7. One output of the timer is connected with a first means 9 for detecting and storing the initial voltage at probe 3 at the initial time. A second means 10 for detecting and storing the measured voltage at a given later time, for instance 1.5 seconds after the initial time, is connected to a second output of the timer. Both means can be formed by so-called sample and hold circuits. The outputs of the first and second means for the detecting and storing of the initial voltage and the measurement voltage 9 and 10 respectively are connected to a subtraction device 11 at whose output 12 a difference voltage is formed from the initial voltage minus the measurement voltage. From this difference voltage a reciprocal is formed in an inverting device 13, which reciprocal represents the uncorrected display voltage.

In order to form this uncorrected display voltage, therefore, after the switching-on of the ignition switch 7 controlled initially by the timer the initial voltage on the probe 3 is stored in the means 9. From the closing of the switch 5 by the timer and the passage of a current pulse through the probe 3 until the time of measurement at which time the switch 5 is again opened, the detection of the measurement voltage at the probe 3—likewise controlled by the timer 8—takes place in the second detection means 10. From the voltage values stored in the means 9 and 10 the uncorrected display voltage is then calculated in the manner indicated.

For the correction of the uncorrected display voltage there is provided in addition, a subtraction device 14 in which the initial voltage at an input 16 is subtracted from a constant reference voltage $U_R$ at an input 15 and multiplied by a constant factor. The correction variable formed in this manner, which is present at the output 17, is subtracted in another subtraction device 18 from the uncorrected display voltage so that the corrected display voltage corresponding to the actual level of filling is indicated by the instrument 19 regardless of the temperature of the liquid.

FIG. 5 shows how an additional sample and hold circuit 9a which has the same function as the means 9 in FIG. 4 is connected, for the formation of the corrected display voltage, to the device for the formation of the uncorrected display voltage 20. The device for producing the uncorrected display voltage corresponds in this connection to the part surrounded by a dashed line in FIG. 4. Corresponding parts have been provided with the same reference numbers in FIGS. 4 and 5.

From FIG. 5 it can furthermore be seen that the sample and hold circuit 9a is controlled by a monostable flip-flop stage 21. In accordance with FIG. 5, in which an additional switch-on delay 22 for use of a special device for the electric monitoring of the level is inserted between said device and the ignition switch 7, the initial voltage is stored in the sample and hold circuit 9a under the control of a short pulse on the line 23. The initial voltage is then available in the sample and hold circuit for the formation of the correction voltage in the subtraction voltage 14. The uncorrected display voltage is fed from the device 20 into the subtraction device 18 in which the difference is formed between the uncorrected display voltage and the correction voltage so that the corrected display voltage can be displayed by the display device 19.

Figure 6:
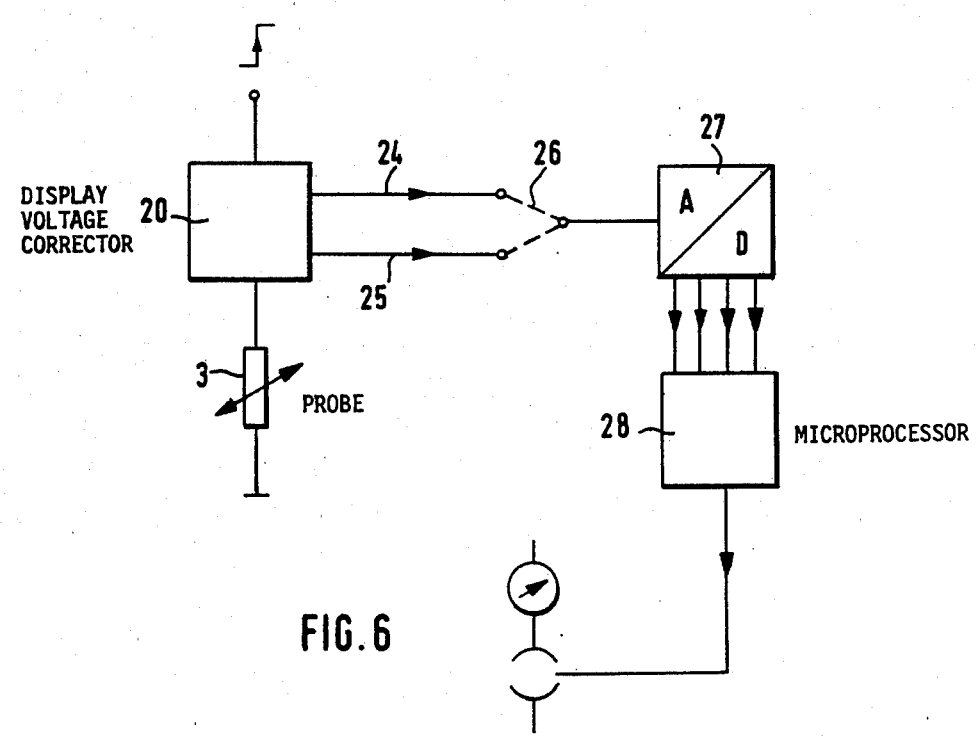
FIG. 6 is a diagrammatic showing of the device developed with a microprocessor in the second method.

In FIG. 6, in which the second method, employing a microprocessor is shown, corresponding parts have also been given the same reference numbers as in FIGS. 4 and 5. In accordance therewith, the uncorrected display voltage is formed in a device 20 on a line 24 while the initial voltage is present as a function of the temperature of the liquid on a line 25. These voltages are fed via a selector switch 26 and an analog/digital converter 27 operated in time-division multiplex operation into the microprocessor 28. In it the characteristics of the display voltage as a function of the temperature for maximum and minimum levels 1 and 2 in FIG. 1 are stored. From the variables fed into the microprocessor, namely the uncorrected display voltage and the initial voltage, there can thus be calculated for these characteristics and the region present between them at each point the corrected display voltage, which is then displayed by the display instrument 19.

The last-mentioned, second method does not require a special resistance probe but it does require a more complicated electronic apparatus than the first method of solution.

We claim:
1. In a device for electric monitoring of the level of a liquid present in a container, with a temperature-dependent resistance probe which is immersed in the liquid the level of which is to be monitored, a source of constant current connectable to the resistance probe, the current controlled by a timer, with means, controlled by the timer, for detecting and storing an initial voltage drop on the resistance probe at an initial time and a measurement voltage at a defined time after the connection of the source and constant current, and means for evaluating these voltages by subtraction of the measurement voltage from the initial voltage in order to form a display voltage which corresponds to the level, the improvement further comprising
means for compensating for an influence of the change in level of the liquid, due to thermal expansion as a function of its initial temperature, on the display voltage, and
means for compensating for different heat transfers from the resistance probe to the liquid as a function of the initial temperature.
2. The device as set forth in claim 1 wherein said means for compensating for the influence of the change in level of the liquid due to thermal expansion is a resistance probe.

3. The device as set forth in claim 2, wherein as said means for compensating for the influence of the change in level of the liquid due to thermal expansion, said resistance probe comprises a resistance wire having an upper vertical section with a resistance length small compared with the length of the wire, and a lower vertical section with a resistance wire length is large compared with the length of the wire.

4. The device as set forth in claim 3, wherein said upper vertical section of the resistance probe is arranged in the region of the container between maximum and minimum levels of the liquid at maximum temperature, and said lower section is arranged in the region of the container below the minimum level at maximum temperature.

5. The device as set forth in claim 1, wherein said means for compensating for different heat transfers from the resistance probe to the liquid comprises an analog computer circuit arrangement having a first subtraction means for forming a correction voltage constituting the difference, multiplied with a factor, between the initial voltage and a fixed reference voltage, and a second subtraction means having an input connected with an output of said first subtraction means for forming the difference between an original uncorrected display voltage and a correction voltage as a corrected display voltage.

6. The device as set forth in claim 5, further including sensing and storage circuit means, a monostable flip-flop means for controlling said sensing and storage circuit means, said circuit means for storing said initial voltage on the resistance probe before switching-in of the resistance probe.

7. In a device for electric monitoring of the level of a liquid present in a container, with a temperature-dependent resistance probe which is immersed in the liquid the level of which is to be monitored, a source of constant current connectable to the resistance probe, the current controlled by a timer, with means, controlled by the timer, for detecting and storing an initial voltage drop on the resistance probe at an initial time and a measurement voltage at a defined time after the connection of the source of constant current, and means for evaluating these voltages by subtraction of the measurement voltage from the initial voltage in order to form a display voltage which corresponds to the level, the improvement further comprising means for compensating for an influence of the change in level of the liquid, due to thermal expansion as a function of its initial temperature, on the display voltage, and means for compensating for different heat transfers from the resistance probe to the liquid as a function of the initial temperature, wherein a microprocessor means constitutes said means for compensating for the influence of the change in level of the liquid due to thermal expansion and said means for compensating for different heat transfers from the resistance probe to the liquid as a function of the initial temperature, said further device further comprising an analog/digital converter connecting said microprocessor means with the resistance probe, and wherein said microprocessor means includes means for storing therein at least characteristic curves of dependency of the uncorrected display voltage on the initial temperature for maximum and minimal filling quantities, and said microprocessor means provides for the calculating of a corrected display voltage from the initial temperature and the original display voltage.

8. In a device for electric monitoring of the level of a liquid present in a container, with a temperature-dependent resistance probe which is immersed in the liquid the level of which is to be monitored, a source of constant current connectable to the resistance probe, the current controlled by a timer; with means, controlled by the timer, for detecting and storing an initial voltage drop on the resistance probe at an initial time and a measurement voltage at a defined time after the connection of the source of constant current, and means for evaluating these voltages by subtraction of the measurement voltage from the initial voltage in order to form a display voltage which corresponds to the level, the improvement further comprising means for compensating for an influence of the change in level of the liquid, due to thermal expansion as a function of its initial temperature, on the display voltage, and means for compensating for different heat transfers from the resistance probe to the liquid as a function of the initial temperature, wherein said means for compensating for the influence of the change in level of the liquid due to thermal expansion is a resistance probe, and wherein said resistance probe comprises a resistance wire having an upper vertical section with a resistance length small compared with the length of the wire, and a lower vertical section with a resistance wire length large compared with the length of the wire.

* * * * *